United States Patent [19]

Harris et al.

[11] Patent Number: 5,596,043
[45] Date of Patent: Jan. 21, 1997

[54] COATING CONTAINING URETHANE AND ACRYLIC RESIN MIXTURE FOR IMPROVED RESISTANCE TO CHIPPING

[75] Inventors: Paul J. Harris, West Bloomfield; Richard J. Foukes, Sterling Heights, both of Mich.

[73] Assignee: BASF Corporation, Southfield, Mich.

[21] Appl. No.: 401,320

[22] Filed: Mar. 9, 1995

[51] Int. Cl.$^6$ ............................................. C08F 8/30
[52] U.S. Cl. ........................... 525/127; 525/131; 525/450; 525/451; 525/454; 525/455; 428/423.1; 428/522
[58] Field of Search .................................. 525/127, 131, 525/450, 451, 454, 455; 428/423.1, 522

[56] References Cited

U.S. PATENT DOCUMENTS 4,451,597   5/1984   Victorius et al. .................... 524/39

Primary Examiner—D. S. Nakarani
Assistant Examiner—Mary Critharis
Attorney, Agent, or Firm—Anne Gerry Sabourin

[57] ABSTRACT

The present invention is a powder coating composition including a resin mixture of polyurethane resin and acrylic resin and a crosslinking agent. The resulting resin has good flexibility and resistance to stone chipping.

11 Claims, No Drawings

COATING CONTAINING URETHANE AND ACRYLIC RESIN MIXTURE FOR IMPROVED RESISTANCE TO CHIPPING

This application discloses and claims subject matter disclosed in an earlier filed application Ser. No. 08/173,296, now abandoned, filed on Dec. 23, 1993.

FIELD OF THE INVENTION

The present invention is directed to powder coating compositions. More specifically, the present invention is directed to coating compositions containing polyurethane resins and acrylic resin.

BACKGROUND OF THE INVENTION

Automotive coatings are subject to various physical stresses. One of these stresses is the severe and sudden impact caused when stones or gravel from the road surface hit the painted surface of the vehicle, causing the coating to chip, known in the art as stone chipping.

It is known in the automotive industry to apply primer coatings and anti-chip coatings to areas of a vehicle which are prone to stone chipping. Coatings for this purpose have conventionally been unsaturated polyester based coatings and acrylic based coatings. Acrylic based primer and anti-chip coatings are desirable because they provide a hard coating and a primer layer that is resistant to degradation by ultraviolet radiation. UV radiation causes intercoat degradation of the primer layer, which causes a loss of adhesion between the primer coating and other coating layers and results in delamination. However, the use of hard acrylic coatings is problematic, as acrylic based coatings also tend to be more brittle and less chip resistant than polyester systems.

The present invention is directed to improving the resistance of the coating to chipping upon contact with stones or gravel. It has been discovered that a powder coating including both a polyurethane resin and an acrylic resin provides a coating with increased flexibility and greatly improved resistance to stone chipping.

The coating may be used alone or over electrocoat, an as a primer in a multi-coat system, where the primer is applied over electrocoat and basecoat and topcoat are applied over the primer coating layer.

SUMMARY OF THE INVENTION

The present invention is a powder coating composition including a hydroxy functional polyurethane resin and an acrylic resin. The acrylic resin provides a hard film, while the polyurethane resin improves flexibility and resistance of the coating to stone chipping. The coating composition is preferably a primer coating composition. To provide optimum chip resistance in the automotive coating, the powder coating of the present invention is preferably applied as a primer in a multi-coat system.

DETAILED DESCRIPTION OF THE INVENTION

The present invention is a powder coating composition including an acrylic resin and a polyurethane resin to provide a coating with improved resistance to stone chipping.

For purposes of the present invention, the polyurethane is the reaction product of a polyol compound having a hydroxy, epoxy or amine functionality and an isocyanate functional compound. The suitable polyols for purposes of the present invention include alkyl polyols, polyester polyols, polyether polyols and acrylic polyols. Polyester polyols can be prepared by ring-opening polymerization of a cyclic ester, such as caprolactone or butyrolactone. The polyol preferably has a molecular weight between 200 and 2000. The preferred polyol is a hydroxy functional polyester polyol.

The polyol is preferably reacted with an unblocked aliphatic diisocyanate having the formula NCO-R-NCO, where R is an aliphatic linkage having a carbon chain length ranging from $C_1$ to $C_{20}$. Particularly useful diisocyanates for the present invention include methylene dicyclohexyl diisocyante, hexamethylene diisocyanate 2-methyl-1,5-pentane diisocyanate, 2,2,4-trimethyl-1,6-hexane diisocyanate, 1,12-dodecane diisocyanate and isophorone diisocyanate (IPDI). Aliphatic diisocyanates are preferred for purposes of the present invention, as the aromatic diisocyanates are less resistant to degradation by ultraviolet radiation. For the powder coating composition of the present invention, the preferred diisocyanate includes cyclohexane derivatives, as the cyclohexane ring is capable of forming conformational isomers. The ability of the cyclohexane ring to change conformation is thought to provide additional flexibility necessary for successful incorporation of the urethane resin in a powder coating. The preferred isocyanate for powder coatings is methylene dicyclohexyl diisocyante, sold under the trademark Desmodur® W from Miles Inc., Mobay Road, Pittsburgh, Pa. 15205.

The polyurethanes are produced by reacting the diol and the isocyanate compound so as to result in the desired molecular weight properties. The diol and isocyanate should be reacted in an amount such that the ratio of the number of isocyanate equivalents of the isocyanate compound to the number of equivalents of hydroxyl groups in the diol is in the range of from 1.0:2.0 to 9:10, preferably from 3:4 to 5:6. Preferably, the resultant polyurethane resin has a number arrange molecular weight ranging from 300 to 5,000. Most preferably the molecular weight range of the polyurethane resin is between 300 and 4000. Particularly preferred are caprolactone based polyols having a molecular weight of between 400 and 3,000 and a hydroxyl number of 250 to 30 mg KOH/g. Polyurethane resins above the molecular weight of 5000 would not be suitable, because the polyurethane would not be able to be finely dispersed throughout a powder coating.

The form the polyurethane resin of the present invention, the polyol and isocyanate compounds are reacted at a temperature of between 15° C. to 125° C., optionally in the presence of a polyurethane catalyst. The polyurethane catalyst used depends upon the particular reactants and reaction conditions. For purposes of the present invention the preferred catalyst is di-butyl tin di-laurate.

Acrylic polymers suitable for the present invention are well known in the art, and can be prepared from monomers such as methyl acrylate, acrylic acid, methacrylic acid, methyl methacrylate, butyl methacrylate, cyclohexyl methacrylate, and the like. The acrylic polymer comprises a functional group which is a hydroxyl, amino or epoxy group, that is reactive with a curing agent The functional group can be incorporated into the ester portion of the acrylic monomer. For example, hydroxyl-functional acrylic copolymers may be formed by polymerization using hydroxyethyl acrylate, hydroxybutyl acrylate, hydroxybutyl methacrylate, or hydroxypropyl acrylate; amino-functional acrylic copolymers by polymerization with t-butylaminoethyl methacrylate and t-butylaminoethylacrylate; epoxy-functional acrylic copolymers by reaction with glycidyl acrylate, glycidyl methacrylate, or allyl glycidyl ether;

Other ethylenically unsaturated monomers that may be used in forming the acrylic copolymer having reactive functionality include esters or nitriles or amides of $\alpha,\beta$-ethylenically unsaturated monocarboxylic acids containing 3 to 5 carbon atoms; vinyl esters, vinyl ethers, vinyl ketones, vinyl amides, and vinyl compounds of aromatics and heterocycles. Representative examples include acrylic and methacrylic acid amides and aminoalkyl amides; acrylonitrile and methacrylonitriles; esters of acrylic and methacrylic acid, particularly those with saturated aliphatic and cycloaliphatic alcohols containing 1 to 20 carbon atoms such as methyl, ethyl, propyl, butyl, 2-ethylhexyl, isobutyl, isopropyl, cyclohexyl, tetrahydrofurfuryl, and isobornyl acrylates and methacrylates; esters of fumaric, maleic, and itaconic acids, like maleic acid dimethyl ester and maleic acid monohexyl ester; vinyl acetate, vinyl propionate, vinyl ethyl ether, and vinyl ethyl ketone; styrene, $\alpha$-methyl styrene, vinyl toluene, and 2-vinyl pyrrolidone.

The copolymers may be prepared by using conventional techniques, such as free radical polymerization, cationic polymerization, or anionic polymerization, in, for example, a batch, semi-batch, or continuous feed process. For instance, the polymerization may be carried out by heating the ethylenically unsaturated monomers in bulk or in solution in the presence of a free radical source, such as an organic peroxide or azo compound and, optionally, a chain transfer agent, in a batch or continuous feed reactor. Alternatively, the monomers and initiator(s) may be fed into the heated reactor at a controlled rate in a semi-batch process. Where the reaction is carried out in a solution polymerization process, the solvent should preferably be removed after the polymerization is completed. Preferably, the polymerization is carried out in the absence of any solvent.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cycohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene. The free radical polymerization is usually carried out at temperatures from about 20° C. to about 250° C., preferably from 90° C. to 170° C. The reaction is carried out according to conventional methods to produce a solid acrylic copolymer.

The preferred acrylic resins have a hydroxyl value of 20 to 120, preferably between 50 and 100, and a number average molecular weight of 3,000 to 35,000, preferably between 10,000 and 20,000. The preferred acrylic polymer for purposes of the present invention is a hydroxy functional acrylic polyol.

The acrylic polymer of the present invention has a glass transition temperature (Tg) of between 30° C. and 60° C., and most preferably between 30° C. and 50° C. The Tg should not be below 30° C. as a Tg lower than this will result in sintering (solidification) of the powder coating composition upon standing.

The powder coating of the present invention includes the polyurethane resin in the resin mixture in an amount between 5 and 45% by weight, preferably between 20 and 40% by weight, and the acrylic resin in an amount between 55 and 95%, preferably between 60 and 80% by weight based on total weight of the resin mixture.

The resin mixture of the polyurethane and acrylic resins is formed by melting the polyurethane resin and then adding the acrylic resin to it in small portions, allowing the acrylic resin to melt into the polyurethane resin. The resin mixture can then be used in a powder coating composition.

Powder coating compositions may be formulated from the polyurethane and acrylic resin mixture and suitable crosslinking agents. Suitable crosslinking agents include any one of a number of well known hydroxy group reactive crosslinking agents, such as polyisocyanates. Suitable polyisocyanates include isocyanurates and biurets of diisocyanates, and other poly-functional isocyanate compounds, such as those formed by reaction of diisocyanates and polyols. Illustrative examples of useful polyisocyanates include polyisocyanates, such as the isocyanaurates or biurets, of isophorone diisocyanate, hexamethylene diisocyanate, toluene diisocyanate, methylene diphenyl diisocyanate, methylene dicyclohexyl diisocyanate, 2-methyl-1,5-pentane diisocyanate, 2,2,4-trimethyl-1,6-hexane diisocyanate and 1,12-dodecane diisocyanate. Poly-functional isocyanate compounds such as the adduct of isophorone diisocyanate with trimethylolpropane may also be used.

In a preferred embodiment, the isocyanate groups of the isocyanate crosslinkers are blocked with a blocking agent. Blocking agents for reaction with the diisocyanates include oximes, such as methylethyl ketoxime, methyl-n-amyl ketoxime, acetone oxime, cyclohexanone oxime and caprolactam; malonic esters; aliphatic, cycloaliphatic, aromatic and alkyl monoalcohols, such as methyl, ethyl, chloroethyl, propyl, butyl, amyl, hexyl, heptyl, octyl, nonyl, 3,3,5-trimethylhexanol, decyl and lauryl alcohols; aromatic-alkyl alcohols, such as phenylcarbinol, ethylene glycol monoethyl ether, monobutyl ether, monopropyl ether. Other blocking agents are phenolic compounds such as phenol itself and substituted phenols where the substituents do not adversely affect the coating operations including cresol, nitrophenol, chlorophenol and t-butyl phenol. Also suitable are dibutyl amine and tertiary hydroxyl amines such as diethylethanolamine. Oxime blocking agents are preferred. One preferred blocked crosslinker, the blocked polyisocyanate of isopohorone diisocyanate, is available commercially from H üuls, Piscataway, N.J. 08855, as Vestagon B 1065.

Other suitable additives may be included in the powder coating composition. These include, but are not limited to pigments, fillers, leveling agents to help coalesce the film, plasticizers, flow control agents to smooth the film, air release agents, hindered amine light stabilizers and ultraviolet light absorbers, antioxidants, and/or catalysts.

Pigments may be utilized in amounts between 0 and 35% by weight, based on total weight of the coating composition.

The thermosetting powder coating compositions can be prepared by first melt blending the ingredients of the coating compositions. This process usually involves dry blending the ingredients in a planetary mixer and then melt blending the admixture in an extruder at a suitable temperature. The extrusion temperature is preferably chosen so that it is high enough to allow the resin to melt to a viscosity that produces good mixing and pigment wetting, but is not so high that any significant amount of co-reaction between resin and crosslinker occurs. The melt blending is usually carried out within the range of from 80° C. to 130° C.

The extrudate is then cooled and pulverized. The extrudate may be crushed to a fine flake or granule and then ground and classified by sieving or other means. The maximum particle size and the particle size distribution are controlled in the classifying step and affect the smoothness of the final film. Requirements for these parameters depend upon the particular use and application method.

The thermosetting powder coating composition can be applied onto many different substrates, including metal substrates such as bare steel, phosphatized steel, galvanized steel, or aluminum; and non-metallic substrates, such as plastics and composites. In a preferred embodiment, the substrate is an automotive body.

Application can be by electrostatic spraying or by use of a fluidized bed. Electrostatic spraying is the preferred method. The coating powder can be applied in one or more passes to provide a film thickness after cure of from 1 to 10 mils, and preferebly from from 2 to 5 mils. The substrate can optionally be preheated prior to application of a powder coating composition to promote uniform and thicker powder deposition.

After application of the coating composition to the substrate, the coating is cured, preferably by heating at a temperature and for a length of time sufficient to cause the reactants to form an insoluble polymeric network. The cure temperature is usually from 160° C. to 205° C., and the length of cure is usually 15 minutes to 60 minutes. Preferably, the coating is cured at 170° C. to 180° C. for 20 to 30 minutes.

The invention is further illustrated by the following non-limiting examples.

EXAMPLES

Example 1

Synthesis of Polyurethane Powder Resin

A 5 liter steel reaction vessel was charged with 870 g 3.26 eq) caprolactone based polyol and 1.0 g dibutyl tin dilaurate. This mixture was slowly heated to 50° C. in order to melt out the polyol and then 305 g (2,175 eq) dihexamethylene diisocyanate was added slowly, over a two hour period, such that the exothermic reaction was held below 100° C. At this stage, the reaction mixture was held at 100° C. for 30 minutes and a further charge of 40 g (0.28 eq) dihexamethylene diisocyanate was added. At this point the reaction temperature rose to 120° C. and was held there for 30 minutes. At this stage a further charge of 20g (0.14 eq) dihexamethylene diisocyanate was added and the temperature maintained at 120° C. for an hour. At this time an NCO titration revealed no free isocyanate in the reaction mixture, and the product was then isolated as a waxy semi-solid.

Example 2

Preparation of the Polyurethane-Acrylic Resin Blend for Powder Coating Composition 750 g of the polyurethane resin from Example 1 was charged to the reactor and heated to 130° C. to melt it. When the polyurethane was melted, 2150 g of an acrylic resin, sold under the trademark Joncryl® 587, (from S. C. Johnson and Son, Racine, Wis. 53403), was added to the reactor in small portions and allowed to melt into the polyurethane resin. The complete charge of acrylic resin was added over 4 hours. At the end of this time the resin was isolated for use in coating compositions.

Example 3

Powder Coating Compositions Prepared With and Without the Resin Blend from Example 2

| Ingredients | Control No Resin Blend | Composition with Resin Blend |
|---|---|---|
| Resin Blend (from Ex. 2) | — | 38.58 g |
| Acrylic Resin[1] | 36.12 g | — |
| Blocked IPDI[2] | 23.83 g | 21.43 g |
| Acid Acrylic Resin[3] | 1.0 g | 1.0 g |
| Flow Additive[4] | 1.00 g | 1.00 g |
| Benzoin[5] | 0.40 g | 0.40 g |
| Lanco Wax[6] | 0.40 g | 0.40 g |
| White Pigment[7] | 18.52 g | 18.52 g |
| Black Pigment[8] | 0.10 g | 0.10 g |
| Filler[9] | 18.52 g | 18.52 g |
| Fumed Silica[10] | 0.05 g | 0.05 g |
| Total | 100.0 | 100.0 |

[1]Joncryl® 587, from S. C. Johnson and Son, Racine Wisconsin 53403.
[2]B1065, from HÜLS America, Piscataway, New Jersey 08855.
[3]SCX 819, from S. C. Johnson and Son, Racine Wisconsin 53403.
[4]EX 505, from Troy Corp., East Hanover, New Jersey 07936.
[5]Uraflow B, from GCA Chemical Corp., Brandenton, Florida 34205.
[6]PP 1362D, from Cray Valley Products, Stuyvesant, New York 12173.
[7]2310, from Kronos Inc., Houston, Texas 77205.
[8]FW200, Degussa Corp., Ridgefield Park, New Jersey 07660.
[9]Baramite XF, Cyprus Foote Mineral Co., Malvern, Pennsylvania 19355
[10]Aerosil 812, Degussa Corp., Ridgefield Park, New Jersey 07660.

The above ingredients were added to a premixer in the order given and mixed for 60 seconds. The mixture was extruded in a Werner and Pfleiderer 2SK 30 extruder at 250 RPM and at 130° C.

Coatings were applied with an ONODA spray gun, Model No. GX108. Panels were sprayed with the urethane acrylic resin mixture to a thickness of between 2.0 and 10 mils over electrocoated cold rolled steel (CRS). The panels were baked for 30 minutes at 350° F. (176.6° C.). Lower cure materials can be made by adjustment to the powder formulation. Where desired applications of basecoat and clearcoat are made and baked for 30 minutes at 509° F. (265° C.).

Example 4

Comparison of Coating Containing Acrylic Resin Blend and Coating with Only Acrylic Coatings prepared in Example 3 were evaluated for stone chip resistance. Both the control and the invention powder coatings were applied over electrocoated cold rolled steel, followed by application of a basecoat and clearcoat. The coatings were applied at following thicknesses for both the invention and the control:

electrocoat −1 mil powder coating −2.5 mils basecoat −0.9 mil clearcoat −2.0 mils.

The stone chip resistance of the of the coating compositions was measured and the results are set forth in the Table below. A GM rating scale was used where 0 indicates total paint removal and 10 indicates no chipping.

TABLE 1

Stone Chip resistance of Coatings

| GRAVEL TYPE | TEMPERATURE | ANGLE | PSI | STONE CHIP RESULTS* | |
|---|---|---|---|---|---|
| | | | | Control | Invention |
| 1 pt. | −20° | 90° | 80 | 8.0 | 9.5 |
| 4 pt | −20° | 90° | 80 | 7.0 | 8.5 |
| 8 pt | −20° | 90° | 80 | 6.0 | 7.5 |

The data set forth in the above table indicate improvement in stone chip resistance for the coating prepared according to the invention containing the acrylic-polyurethane mixture in comparison to the control without the mixture.

We claim:

1. A powder coating composition comprising
   a) a resin mixture of
      i) a polyurethane resin having a functional group selected from the group consisting of hydroxy, amino and epoxy functionalities and having a number average molecular weight of between 300 and 5,000
      ii) an acrylic resin having a functional group selected from the group consisting of hydroxy, amino and epoxy functionalities and having a Tg of between 30° and 60° C.
   b) a crosslinking agent, reactable with the functional groups on the polyurethane and acrylic resins.

2. The powder coating composition of claim 1, wherein the polyurethane is obtained by reaction of a hydroxy functional polyol selected from the group consisting of alkyl polyols, polyester polyols, polyether polyols and acrylic polyols and isocyanate selected from the group consisting of methylene dicyclohexyl diisocyante, hexamethylene diisocyanate, 2-methyl-1,5-pentane diisocyanate, 2,2,4-trimethyl-1,6-hexane diisocyante, 1,12-dodecane diisocyanate and isophorone diisocyanate.

3. The powder coating composition of claim 1, wherein the acrylic resin is hydroxy functional and has a number average molecular weight ranging from 3,000 to 35,000 and has a hydroxyl value of 20 to 120.

4. The powder coating composition of claim 1, wherein the polyurethane resin is present in an amount between 5 and 45% by weight, and the acrylic resin is present in an amount between 55 and 95% by weight based on total weight of the resin mixture.

5. The powder coating composition of claim 1, wherein the polyurethane resin is present in an amount between 25 and 45% by weight, and the acrylic resin is present in an amount between 55 and 75% by weight based on total weight of the resin mixture.

6. The powder coating composition of claim 1, wherein the acrylic resin is hydroxy functional.

7. The powder coating composition of claim 1, wherein the urethane resin is hydroxy functional.

8. The powder coating composition of claim 1, wherein the polyurethane resin is obtained by reaction of a hydroxy functional polyol and an unblocked aliphatic polyisocyanate.

9. The powder coating composition of claim 8, wherein the polyurethane has a ratio of isocyanate equivalents of the isocyanate component to equivalents of hydroxyl groups in the polyol component ranging from 1.0: 2.0 to 9:10.

10. The powder coating composition of claim 8, wherein the acrylic resin is a hydroxy functional acrylic resin.

11. The powder coating composition of claim 1, wherein the coating composition is a primer coating.

* * * * *